(12) United States Patent
Jung

(10) Patent No.: US 12,415,497 B2
(45) Date of Patent: Sep. 16, 2025

(54) ELECTROMECHANICAL BRAKE SYSTEM AND METHOD OF CONTROLLING THE SAME

(71) Applicant: HL MANDO CORPORATION, Gyeonggi-do (KR)

(72) Inventor: Samhyun Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 248 days.

(21) Appl. No.: 18/094,988

(22) Filed: Jan. 10, 2023

(65) Prior Publication Data

US 2023/0219551 A1    Jul. 13, 2023

(30) Foreign Application Priority Data

Jan. 10, 2022    (KR) .................. 10-2022-0003532

(51) Int. Cl.
*B60T 17/22*    (2006.01)
(52) U.S. Cl.
CPC ....... *B60T 17/221* (2013.01); *B60T 2270/406* (2013.01); *B60T 2270/88* (2013.01)
(58) Field of Classification Search
CPC .... B60T 13/662; B60T 13/686; B60T 13/745; B60T 17/221; B60T 2270/406; B60T 2270/88; B60T 7/042
See application file for complete search history.

(56) References Cited

U.S. PATENT DOCUMENTS

| | | | | |
|---|---|---|---|---|
| 5,897,175 A | * | 4/1999 | Terazawa | B60T 8/441 303/155 |
| 6,244,676 B1 | * | 6/2001 | Watanabe | B60T 8/4872 303/191 |
| 11,958,461 B2 | * | 4/2024 | Mahnkopf | B60T 7/042 |
| 2012/0198959 A1 | * | 8/2012 | Leiber | B60T 7/042 74/514 |
| 2012/0306261 A1 | * | 12/2012 | Leiber | B60T 13/745 303/146 |
| 2012/0310502 A1 | * | 12/2012 | Garbe | B60T 7/042 701/70 |
| 2013/0049449 A1 | * | 2/2013 | Watanabe | B60T 8/4063 303/3 |
| 2015/0108829 A1 | * | 4/2015 | Miyazaki | B60T 13/142 303/10 |
| 2018/0065488 A1 | * | 3/2018 | Nam | B60T 8/172 |

(Continued)

FOREIGN PATENT DOCUMENTS

KR    10-2018-0039994    4/2018
KR    10-2020-0107686    9/2020

*Primary Examiner* — Carl C Staubach
(74) *Attorney, Agent, or Firm* — WOMBLE BOND DICKINSON (US) LLP

(57) ABSTRACT

The present disclosure relates to an electromechanical brake system and a method of controlling the same, and according to one aspect of the present disclosure, the method of controlling the electromechanical brake system may include calculating a required fluid amount according to an actual pressure required for brake oil required to generate a braking force by the motor, calculating a ratio of the calculated required fluid amount and a required fluid amount reference according to a map, and applying the required fluid amount as the required fluid amount reference according to the calculated ratio.

10 Claims, 5 Drawing Sheets

(56) References Cited

U.S. PATENT DOCUMENTS

| | | | |
|---|---|---|---|
| 2018/0141526 A1* | 5/2018 | Li | B60T 8/172 |
| 2018/0215366 A1* | 8/2018 | Leiber | B60T 8/4022 |
| 2019/0092174 A1* | 3/2019 | Lee | B60L 7/26 |
| 2020/0017093 A1* | 1/2020 | Bieltz | H02P 6/24 |
| 2020/0216051 A1* | 7/2020 | Mannherz | B60T 13/66 |
| 2021/0088094 A1* | 3/2021 | Kane | B60T 17/22 |
| 2021/0221231 A1* | 7/2021 | Maruyama | B60L 7/18 |
| 2024/0083434 A1* | 3/2024 | Miyagi | B60L 1/003 |

* cited by examiner

ELECTROMECHANICAL BRAKE SYSTEM AND METHOD OF CONTROLLING THE SAME

CROSS-REFERENCE TO RELATED APPLICATION

This application is based on and claims priority under 35 U.S.C. § 119 to Korean Patent Application No. 10-2022-0003532, filed on Jan. 10, 2022 in the Korean Intellectual Property Office, the disclosure of which is incorporated herein by reference.

BACKGROUND

1. Field

Embodiments of the present disclosure relate to an electromechanical brake system and a method of controlling the same, and more specifically, to an electromechanical brake system capable of controlling a required fluid amount of brake oil and a method of controlling the same.

2. Description of the Related Art

A vehicle necessarily includes a brake system for braking. Recently, such a brake system electronically controls braking hydraulic pressure transmitted toward a wheel cylinder mounted on a wheel in order to obtain a stronger and more stable braking force.

The conventional brake systems use a method of supplying hydraulic pressure required for braking to a wheel cylinder using a mechanically connected booster when a driver steps on a brake pedal. However, as the demand for effectively implementing a braking function in various environments by minutely responding to the operating environment of a vehicle increases, an electromechanical brake system is used. The electromechanical brake system uses a hydraulic supply device for converting the driver's braking intention into a signal using a pedal displacement sensor for detecting the displacement of a brake pedal when the driver steps on the brake pedal and supplying hydraulic pressure required for braking to a wheel cylinder according to the signal.

Since a braking force is generated by a motor in such an electromechanical brake system, a reference amount is needed for the required fluid amount of brake oil. The required fluid amount of the brake oil represents the relationship between a position of the motor and the hydraulic pressure of the brake oil.

However, since the required fluid amount of the brake oil varies depending on a state of a vehicle, there is a problem in that when the required fluid amount of the brake oil is significantly changed as compared to the reference amount, brake control performance is degraded.

SUMMARY

Therefore, it is an aspect of the present disclosure to provide an electromechanical brake system that is applicable when a required amount of brake oil is changed as compared to a reference amount and a method of controlling the same.

Additional aspects of the disclosure will be set forth in part in the description which follows and, in part, will be obvious from the detailed description, or may be learned by practice of the disclosure.

In accordance with one aspect of the present disclosure, a method of controlling an electromechanical brake system includes calculating a required fluid amount according to an actual pressure required for brake oil required to generate a braking force by a motor, calculating a ratio of the calculated required fluid amount and a required fluid amount reference according to a map, and applying the required fluid amount as the required fluid amount reference according to the calculated ratio.

The method may further include determining whether to monitor the required fluid amount, wherein the determining of whether to monitor the required fluid amount comprises performing the monitoring the required fluid amount in cases in which the required fluid amount is continuously changed.

The cases in which the required fluid amount is continuously changed may be cases excluding one or more of a case in which an estimated brake temperature is higher than a set temperature and a case in which an outside air temperature is lower than the set temperature.

The cases in which the required fluid amount is continuously changed may be cases excluding one or more among a case in which the required fluid amount is actively increased by a driver, a case in which vehicle suddenly decelerates, and a case in which a brake oil pressure is low.

The method may further include determining whether the required fluid amount is applicable as the required fluid amount reference, wherein the applying of the required fluid amount as the required fluid amount reference may be performed when it is determined that required fluid amount is applicable in the determining of whether the required fluid amount is applicable.

In the determining of whether the required fluid amount is applicable comprises determining that the required fluid amount is applicable when the ratio of the calculated required fluid amount and the required fluid amount reference is calculated in a plurality of sections divided according to pressure.

In the determining of whether the required fluid amount is applicable comprises determining that the required fluid amount is applicable when the ratio of the required fluid amount and the required fluid amount reference is calculated multiple times in one or more sections among a plurality of sections divided according to pressure.

In the determining of whether the required fluid amount is applicable comprises determining that the required fluid amount is applicable when a traveling distance of a vehicle to which the braking force is provided by the motor is a predetermined distance or more.

In the determining of whether the required fluid amount is applicable comprises determining that the required fluid amount is applicable when a traveling distance of a vehicle to which the braking force is provided by the motor is a predetermined distance or more after the required fluid amount has been applied as the required fluid amount reference.

The ratio of the required fluid amount and the required fluid amount reference may be calculated by dividing the required fluid amount by the required fluid amount reference according to pressure.

Meanwhile, according to one aspect of the present disclosure, an electromechanical brake system includes a temperature sensor for measuring one or more of a brake oil temperature and an outside air temperature in order to monitor a required fluid amount according to an actual pressure required for brake oil required to generate a braking force by the motor, a pressure sensor for measuring a pressure for the required fluid amount, and a controller for determining whether to monitor the required fluid amount based on information measured by the temperature sensor and the pressure sensor and calculate a ratio of the required fluid amount and a required fluid amount reference according to a map and the required fluid amount.

The controller may apply the required fluid amount as the required fluid amount reference according to the ratio of the required fluid amount and the required fluid amount reference according to the map.

The controller may monitor the required fluid amount in cases in which the required fluid amount is continuously changed.

The cases in which the required fluid amount is continuously changed may be cases excluding one or more of a case in which an estimated brake temperature is higher than a set temperature and a case in which an outside air temperature is lower than the set temperature.

The cases in which the required fluid amount is continuously changed may be cases excluding one or more among a case in which the required fluid amount is actively increased by a driver, a case in which a vehicle suddenly decelerates, and a case in which a brake oil pressure is low.

The controller may determine whether the required fluid amount is applicable as the required fluid amount reference and apply the required fluid amount as the required fluid amount reference.

The controller may determine that the ratio of the calculated required fluid amount and the required fluid amount reference is applicable when calculated in a plurality of sections divided according to the pressure.

The controller may determine that the ratio of the required fluid amount and the required fluid amount reference is applicable when calculated multiple times in one or more among a plurality of sections divided according to the pressure.

The controller may determine that the ratio of the required fluid amount and the required fluid amount reference is applicable when a traveling distance of a vehicle to which the braking force is provided by the motor is a predetermined distance or more.

The controller may determine that the ratio is applicable when a traveling distance of a vehicle to which the braking force is provided by the motor is a predetermined distance or more after the required fluid amount has been applied as the required fluid amount reference.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
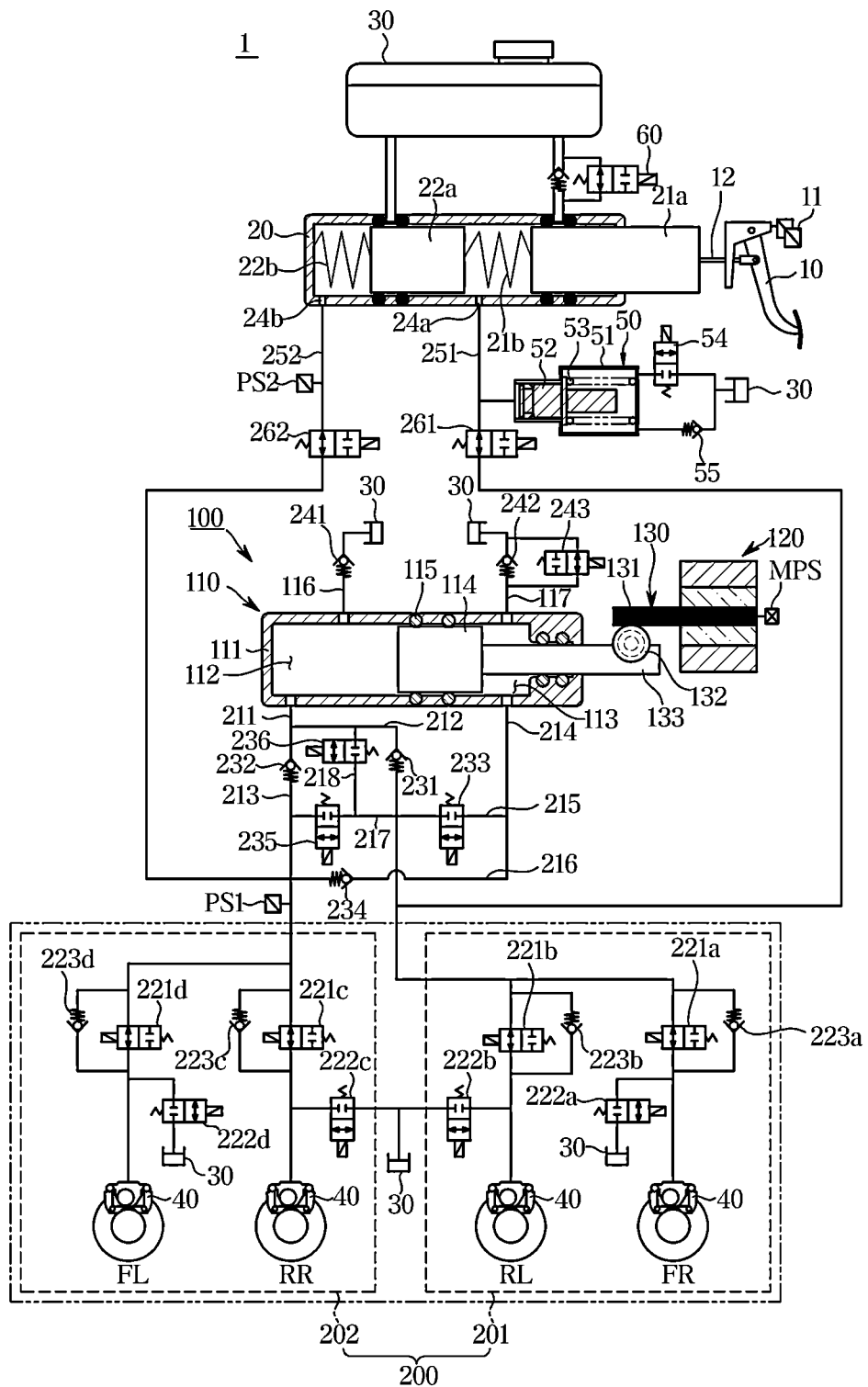
FIG. 1 is a hydraulic circuit diagram showing an electromechanical brake system according to one embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Referring to FIG. 1, an electromechanical brake system 1 according to one embodiment of the present disclosure will be described.

The electromechanical brake system 1 generally includes a master cylinder 20 for generating hydraulic pressure, a reservoir 30 coupled to an upper portion of the master cylinder 20 to store a brake fluid, an input rod 12 for pressing the master cylinder 20 according to a force pressing a brake pedal 10, a wheel cylinder 40 for receiving the hydraulic pressure and performing braking of respective vehicle wheels RR, RL, FR, and FL, a pedal position sensor 11 for detecting displacement of the brake pedal 10, and a simulation device 50 for providing a reaction force according to the force pressing the brake pedal 10.

In addition, although not shown in FIG. 1, a wheel speed sensor may be provided in each wheel cylinder 40 to measure a speed of each of the wheels FL, RR, RL, and FR.

The master cylinder 20 may have at least one chamber to generate the hydraulic pressure. For example, the master cylinder 20 may have two chambers, each chamber may be provided with a first piston 21*a* and a second piston 22*a*, and the first piston 21*a* may be connected to the input rod 12. In addition, the master cylinder 20 may have first and second hydraulic ports 24*a* and 24*b* through which hydraulic pressure is discharged from each of the two chambers.

Meanwhile, the master cylinder 20 may have two chambers, thereby securing safety upon failure. For example, one of the two chambers may be connected to the front right wheel FR and the rear left wheel RL of the vehicle, and the other chamber may be connected to the front left wheel FL and the rear right wheel RR. As described above, the two chambers may be independently configured so that the braking of a vehicle is possible even when one chamber fails.

In addition, a first spring 21*b* may be provided between the first piston 21*a* and the second piston 22*a* of the master cylinder 20, and a second spring 22*b* may be provided between the second piston 22*a* and an end of the master cylinder 20.

The first spring 21*b* and the second spring 22*b* are provided in each of the two chambers, and as the displacement of the brake pedal 10 varies, the first piston 21*a* and the second piston 22*a* are pushed, and an elastic force is stored in the first spring 21*b* and the second spring 22*b*. In addition, when a force pushing the first piston 21*a* becomes smaller than the elastic force, the first spring 21*b* and the second spring 22*b* may push the first and second pistons 21*a* and 22*a* back to original states using the stored elastic force.

Meanwhile, the input rod 12 for pushing the first piston 21*a* of the master cylinder 20 may be in close contact with the first piston 21*a*. In other words, a gap between the master cylinder 20 and the input rod 12 may not be present. Therefore, when the brake pedal 10 is pressed, the master cylinder 20 may be directly pressed without a pedal invalid stroke section.

The simulation device 50 may be connected to a first backup flow path 251 to be described below to provide a reaction force according to the force pressing the brake pedal 10. As the reaction force is provided as much as compensating for the pressing force provided by a driver, the driver may minutely adjust a braking force as intended.

The simulation device 50 includes a pedal simulator including a simulation chamber 51 provided to store a brake fluid discharged from the first hydraulic port 24*a* of the master cylinder 20, a reaction force piston 52 provided in the simulation chamber 51, and a reaction force spring 53 for elastically supporting the reaction force piston 52 and a simulator valve 54 connected to a rear end of the simulation chamber 51.

The reaction force piston 52 and the reaction force spring 53 are installed to have displacement in a certain range within the simulation chamber 51 by the brake fluid introduced into the simulation chamber 51.

The simulator valve 54 may be provided on a flow path connecting the rear end of the simulation chamber 51 and the reservoir 30. A front end of the simulation chamber 51 may be connected to the master cylinder 20, and the rear end of the simulation chamber 51 may be connected to the reservoir 30 through the simulator valve 54. Therefore, even when the reaction force piston 52 returns, the brake fluid in the reservoir 30 may be introduced through the simulator valve 54, and thus the entire inside of the simulation chamber 51 may be filled with the brake fluid.

Meanwhile, several reservoirs 30 are shown in the drawing, and each reservoir 30 uses the same reference numeral. However, the reservoirs may be provided as the same component or different components. For example, the reservoir 30 connected to the simulation device 50 may be the same as the reservoir 30 connected to the master cylinder 20 or may be a storage capable of storing a brake fluid separately from the reservoir 30 connected to the master cylinder 20.

The simulator valve 54 may be configured as a normally closed type solenoid valve that remains in a normally closed state. The simulator valve 54 may be opened when the driver applies a pressing force to the brake pedal 10 and may transmit the brake fluid in the simulation chamber 51 to the reservoir 30.

In addition, a simulator check valve 55 may be installed between the simulation chamber 51 and the reservoir 30 to be connected parallel to the simulator valve 54. The simulator check valve 55 may allow the brake fluid in the reservoir 30 to flow to the simulation chamber 51 and block the brake fluid in the simulation chamber 51 from flowing to the reservoir 30 through a flow path on which the check valve 55 is installed. The brake fluid may be supplied into the simulation chamber 51 through the simulator check valve 55 when the force pressing the brake pedal 10 is released, thereby ensuring the quick return of a pedal simulator pressure.

A hydraulic supply device 100 may include a hydraulic provision unit 110 for providing the hydraulic pressure of the brake fluid transmitted to the wheel cylinder 40, a motor 120 for generating a rotational force by an electrical signal of the pedal position sensor 11, and a power converter 130 for converting a rotational motion of the motor 120 into a linear motion and transmitting the linear motion to the hydraulic provision unit 110. Alternatively, the hydraulic provision unit 110 may also be operated not by a driving force supplied from the motor 120 but by pressure supplied from a high-pressure accumulator.

The electromechanical brake system 1 may include the hydraulic supply device 100 mechanically operated after receiving a driver's braking intention as the electrical signal from the pedal position sensor 11 for detecting the displacement of the brake pedal 10, a hydraulic control unit 200 including first and second hydraulic circuits 201 and 202, each of which controls the flow of the hydraulic pressure transmitted to two wheel cylinders 40 provided on the vehicle wheels RR, RL, FR, and FL, a first cut valve 261 provided on the first backup flow path 251 connecting the first hydraulic port 24*a* and the first hydraulic circuit 201 to control the flow of the hydraulic pressure, a second cut valve 262 provided on a second backup flow path 252 connecting the second hydraulic port 24*b* and the second hydraulic circuit 202 to control the flow of the hydraulic pressure, and an electronic control unit for controlling the hydraulic supply device 100 and valves 54, 60, 221*a*, 221*b*, 221*c*, 221*d*, 222*a*, 222*b*, 222*c*, 222*d*, 233, 235, 236, and 243 based on hydraulic pressure information and pedal displacement information.

The electronic control unit may perform the overall control of the electromechanical brake system 1.

The electronic control unit 2000 may perform the overall control of the electromechanical brake system 1.

The hydraulic provision unit 110 includes a cylinder block 111 in which a pressure chamber for receiving and storing a brake fluid is formed, a hydraulic piston 114 accommodated in the cylinder block 111, a hydraulic piston 114 accommodated in the cylinder block 111, a sealing member 115 (115a and 115b) provided between the hydraulic piston 114 and the cylinder block 111 to seal a pressure chamber, and a driving shaft 133 connected to a rear end of the hydraulic piston 114 to transmit power output from the power converter 130 to the hydraulic piston 114.

The pressure chamber may include a first pressure chamber 112 positioned in front of the hydraulic piston 114 (forward direction or left direction in the drawing) and a second pressure chamber 113 positioned behind the hydraulic piston 114 (reverse direction or right direction in the drawing). In other words, the first pressure chamber 112 is partitioned by the cylinder block 111 and a front end of the hydraulic piston 114 and provided so that a volume varies according to the movement of the hydraulic piston 114, and the second pressure chamber 113 is partitioned by the cylinder block 111 and the rear end of the hydraulic piston 114 and provided so that a volume varies according to the movement of the hydraulic piston 114.

The first and second pressure chambers 112 and 113 may be connected to the reservoir 30 by dump flow paths 116 and 117, respectively, and may receive and store a brake fluid from the reservoir 30 or transmit the brake fluid in the first or second pressure chamber 112 or 113 to the reservoir 30.

Next, flow paths 211, 212, 213, 214, 215, 216, and 217 and valves 231, 232, 233, 234, 235, 236, 241, 242, and 243 connected to the first pressure chamber 112 and the second pressure chamber 113 will be described.

The second hydraulic flow path 212 may communicate with the first hydraulic circuit 201, and the third hydraulic flow path 213 may communicate with the second hydraulic circuit 202. Therefore, hydraulic pressure may be transmitted to the first hydraulic circuit 201 and the second hydraulic circuit 202 by the advance of the hydraulic piston 114.

In addition, the electromechanical brake system 1 may include a first control valve 231 and a second control valve 232 respectively provided on the second and third hydraulic flow paths 212 and 213 to control the flow of the brake fluid.

In addition, the first and second control valves 231 and 232 may be provided as a check valve for allowing only the flow of the brake fluid in a direction from the first pressure chamber 112 toward the first or second hydraulic circuit 201 or 202 and blocking the flow of the brake fluid in the opposite direction. In other words, the first or second control valve 231 or 232 may allow the hydraulic pressure of the first pressure chamber 112 to be transmitted to the first or second hydraulic circuit 201 or 202 and prevent the hydraulic pressure of the first or second hydraulic circuit 201 or 202 from leaking to the first pressure chamber 112 through the second or third hydraulic flow path 212 or 213.

Meanwhile, the fourth hydraulic flow path 214 may be branched off into a fifth hydraulic flow path 215 and a sixth hydraulic flow path 216 and may communicate with both of the first hydraulic circuit 201 and the second hydraulic circuit 202. For example, the fifth hydraulic flow path 215 branched off from the fourth hydraulic flow path 214 may communicate with the first hydraulic circuit 201, and the sixth hydraulic flow path 216 branched off from the fourth hydraulic flow path 214 may communicate with the second hydraulic circuit 202. Therefore, hydraulic pressure may be transmitted to both of the first hydraulic circuit 201 and the second hydraulic circuit 202 by retreat of the hydraulic piston 114.

In addition, the electromechanical brake system 1 may include a third control valve 233 provided on the fifth hydraulic flow path 215 to control the flow of the brake fluid and a fourth control valve 234 provided on the sixth hydraulic flow path 216 to control the flow of the brake fluid.

The third control valve 233 may be provided as a bi-directional control valve for controlling the flow of the brake fluid between the second pressure chamber 113 and the first hydraulic circuit 201. In addition, the third control valve 233 may be provided as a normally closed type solenoid valve operated so that the valve is opened when receiving an opening signal from the electronic control unit in a normally closed state.

In addition, the fourth control valve 234 may be provided as a check valve for allowing only the flow of the brake fluid in a direction from the second pressure chamber 113 to the second hydraulic circuit 202 and blocking the flow of the brake fluid in an opposite direction. In other words, the fourth control valve 234 can prevent the hydraulic pressure of the second hydraulic circuit 202 from leaking to the second pressure chamber 113 through the sixth hydraulic flow path 216 and the fourth hydraulic flow path 214.

In addition, the electromechanical brake system 1 may include a fifth control valve 235 provided on the seventh hydraulic flow path 217 connecting the second hydraulic flow path 212 and the third hydraulic flow path 213 to control the flow of the brake fluid and a sixth control valve 236 provided on the eighth hydraulic flow path 218 connecting the second hydraulic flow path 212 and the seventh hydraulic flow path 217 to control the flow of the brake fluid. In addition, the fifth control valve 235 and the sixth control valve 236 may be provided as normally closed type solenoid valves operated so that the valves are opened when receiving the opening signal from the electronic control unit in the normally closed state.

The fifth control valve 235 and the sixth control valve 236 may be operated to be opened when an abnormality occurs in the first control valve 231 or the second control valve 232 so that the hydraulic pressure in the first pressure chamber 112 may be transmitted to both of the first hydraulic circuit 201 and the second hydraulic circuit 202.

In addition, the fifth control valve 235 and the sixth control valve 236 may be operated to be opened when the hydraulic pressure in the wheel cylinder 40 is suctioned and sent to the first pressure chamber 112. This is because the first control valve 231 and the second control valve 232 provided on the second hydraulic flow path 212 and the third hydraulic flow path 213 are provided as the check valves for allowing only the unidirectional flow of the hydraulic fluid.

In addition, the electromechanical brake system 1 may further include a first dump valve 241 and a second dump valve 242 respectively provided on the first and second dump flow paths 116 and 117 to control the flow of the brake fluid. The dump valves 241 and 242 may be check valves opened only in a direction from the reservoir 30 to the first or second pressure chamber 112 or 113 and closed in an opposite direction. In other words, the first dump valve 241 may be the check valve for allowing the flow of the brake fluid from the reservoir 30 to the first pressure chamber 112 and blocking the flow of the brake fluid from the first pressure chamber 112 to the reservoir 30, and the second dump valve 242 may be the check valve for allowing the flow of the brake fluid from the reservoir 30 to the second pressure chamber 113 and blocking the flow of the brake fluid from the second pressure chamber 113 to the reservoir 30.

In addition, the second dump flow path 117 may include a bypass flow path, and the third dump valve 243 for controlling the flow of the brake fluid between the second pressure chamber 113 and the reservoir 30 may be installed on the bypass flow path.

The third dump valve 243 may be provided as the solenoid valve capable of controlling the bi-directional flow and provided as a normally open type solenoid valve operated so that the valve is closed when receiving a closing signal from the electronic control unit in a normally open state.

The hydraulic provision unit 110 of the electromechanical brake system 1 may be operated in a double-acting manner. In other words, as the hydraulic piston 114 advances, the hydraulic pressure generated in the first pressure chamber 112 may be transmitted to the first hydraulic circuit 201 through the first hydraulic flow path 211 and the second hydraulic flow path 212 to operate the wheel cylinders 40 installed on the front right wheel FR and the rear left wheel RL and transmitted to the second hydraulic circuit 202 through the first hydraulic flow path 211 and the third hydraulic flow path 213 to operate the wheel cylinders 40 installed on the rear right wheel RR and the front left wheel FL.

Likewise, the hydraulic pressure generated in the second pressure chamber 113 as the hydraulic piston 114 retreats may be transmitted to the first hydraulic circuit 201 through the fourth hydraulic flow path 214 and the fifth hydraulic flow path 215 to operate the wheel cylinders 40 installed on the front right wheel FR and the rear left wheel RL and transmitted to the second hydraulic circuit 202 through the fourth hydraulic flow path 214 and the sixth hydraulic flow path 216 to operate the wheel cylinders 40 installed on the rear right wheel RR and the front left wheel FL.

In addition, a negative pressure generated in the first pressure chamber 112 as the hydraulic piston 114 retreats may suction the brake fluid in the wheel cylinders 40 installed on the front right wheel FR and the rear left wheel RL to transmit the brake fluid to the first pressure chamber 112 through the first hydraulic circuit 201, the second hydraulic flow path 212, and the first hydraulic flow path 211 and suction the brake fluid in the wheel cylinders 40 installed on the rear right wheel RR and the front left wheel FL to transmit the brake fluid to the first pressure chamber 112 through the second hydraulic circuit 202, the third hydraulic flow path 213, and the first hydraulic flow path 211.

Next, the motor 120 and the power converter 130 of the hydraulic supply device 100 will be described.

The motor 120 is a device for generating a rotational force by a signal output from the electronic control unit and may generate the rotational force in a forward or reverse direction. A rotational angular velocity and a rotational angle of the motor 120 may be precisely controlled.

In addition, a motor position sensor MPS is a motor control sensor for controlling the rotational angle or a current of the motor 120.

In other words, the hydraulic supply device 100 may further include the motor position sensor MPS for measuring the rotational angular velocity and rotational angle of the motor 120 and send information on rotational angles and positions of the motor 120 to the electronic control unit.

Meanwhile, the electronic control unit includes the motor 120 and controls the plurality of valves 54, 60, 221a, 221b, 221c, 221d, 222a, 222b, 222c, 222d, 233, 235, 236, and 243.

In addition, an operation of controlling the plurality of valves according to the displacement of the brake pedal 10 in the electronic control unit will be described below.

A driving force of the motor 120 generates the displacement of the hydraulic piston 114 through the power converter 130, and the hydraulic pressure generated as the hydraulic piston 114 slides in the pressure chamber is transmitted to the wheel cylinders 40 installed on the respective vehicle wheels RR, RL, FR, and FL through the first and second hydraulic flow paths 211 and 212.

The power converter 130 is a device for converting the rotational force into a linear motion and may include, for example, a worm shaft 131, a worm wheel 132, and the driving shaft 133.

In other words, a displacement signal detected by the pedal position sensor 11 when the displacement of the brake pedal 10 occurs is transmitted to the electronic control unit, and the electronic control unit drives the motor 120 in one direction and rotates the worm shaft 131 in the one direction. The rotational force of the worm shaft 131 is transmitted to the driving shaft 133 through the worm wheel 132, and the hydraulic piston 114 connected to the driving shaft 133 moves forward and generates hydraulic pressure in the first pressure chamber 112.

Conversely, when the pressing force is released from the brake pedal 10, the electronic control unit drives the motor 120 in an opposite direction so that the worm shaft 131 rotates in the opposite direction. Therefore, the worm wheel 132 also rotates in the opposite direction, and as the hydraulic piston 114 connected to the driving shaft 133 returns (retreats), a negative pressure is generated in the first pressure chamber 112.

Meanwhile, the hydraulic pressure and the negative pressure may also be generated in a direction opposite to the above direction. In other words, the displacement signal detected by the pedal position sensor 11 when the displacement of the brake pedal 10 occurs is transmitted to the electronic control unit, and the electronic control unit drives the motor 120 in the opposite direction and rotates the worm shaft 131 in the opposite direction. The rotational force of the worm shaft 131 is transmitted to the driving shaft 133 through the worm wheel 132, and hydraulic pressure is generated in the second pressure chamber 113 as the hydraulic piston 114 connected to the driving shaft 133 retreats.

Conversely, when the pressing force is removed from the brake pedal 10, the electronic control unit drives the motor 120 in one direction so that the worm shaft 131 rotates in the one direction. Therefore, the worm wheel 132 also rotates in the opposite direction, and as the hydraulic piston 114 connected to the driving shaft 133 returns (advances), a negative pressure is generated in the second pressure chamber 113.

As described above, the hydraulic supply device 100 serves to transmit the hydraulic pressure to the wheel cylinder 40 or suction the hydraulic pressure according to the rotational direction of the rotational force generated from the motor 120 to transmit the hydraulic pressure to the reservoir 30.

Meanwhile, when the motor 120 rotates in one direction, hydraulic pressure may be generated in the first pressure chamber 112 or a negative pressure may be generated in the second pressure chamber 113, and whether braking is performed using the hydraulic pressure or is released using the negative pressure may be determined by controlling the valves 54, 60, 221a, 221b, 221c, 221d, 222a, 222b, 222c, 222d, 233, 235, 236, and 243 constituting a plurality of valves 800.

In addition to a structure of a ball-screw-nut assembly, it should be understood that any structure of the power converter 130 according to one embodiment may be adopted as long as the structure can convert a rotational motion into a linear motion.

The first cut valve 261 for controlling the flow of the brake fluid may be provided on the first backup flow path 251, and a second cut valve 262 for controlling the flow of the brake fluid may be provided on the second backup flow path 252. In addition, the first backup flow path 251 may connect the first hydraulic port 24a and the first hydraulic circuit 201, and the second backup flow path 252 may connect the second hydraulic port 24b and the second hydraulic circuit 202.

In addition, the first and second cut valves 261 and 262 may be normally open type solenoid valves operated so that the valves are closed when receiving the closing signal from the electronic control unit in a normally open state.

Next, referring to FIG. 1, the hydraulic control unit 200 according to one embodiment will be described.

The hydraulic control unit 200 may include the first hydraulic circuit 201 and the second hydraulic circuit 202 for receiving hydraulic pressure, each of which controls two wheels. For example, the first hydraulic circuit 201 may control the front right wheel FR and the rear left wheel RL, and the second hydraulic circuit 202 may control the front left wheel FL and the rear right wheel RR. In addition, the wheel cylinder 40 is installed on each of the vehicle wheels FR, FL, RR, and RL to receive hydraulic pressure and perform braking.

The first hydraulic circuit 201 is connected to the first hydraulic flow path 211 and the second hydraulic flow path 212 to receive hydraulic pressure from the hydraulic supply device 100 or the master cylinder 20, and the second hydraulic flow path 212 is branched off into two flow paths connected to the front right wheel FR and the rear left wheel RL. Likewise, the second hydraulic circuit 202 is connected to the first hydraulic flow path 211 and the third hydraulic flow path 213 to receive hydraulic pressure from the hydraulic supply device 100, and the third hydraulic flow path 213 is branched off into two flow paths connected to the front left wheel FL and the rear right wheel RR.

The hydraulic circuits 201 and 202 may include a plurality of inlet valves 221 (221a, 221b, 221c, and 221d) to control the flow of the hydraulic pressure. For example, the first hydraulic circuit 201 may be provided with the two inlet valves 221a and 221b connected to the first hydraulic flow path 211 to control the hydraulic pressure transmitted to the two wheel cylinders 40. In addition, the second hydraulic circuit 202 may be provided with the two inlet valves 221c and 221d connected to the second hydraulic flow path 212 to control the hydraulic pressure transmitted to the wheel cylinders 40.

In addition, the inlet valve 221 may be provided as the normal open type solenoid valve disposed upstream of the wheel cylinder 40 and operated so that the valve is closed when receiving the closing signal from the electronic control unit in the normally open state.

In addition, the hydraulic circuits 201 and 202 may include check valves 223a, 223b, 223c, and 223d provided on bypass flow paths connecting the fronts and rears of the respective inlet valves 221a, 221b, 221c, and 221d. The check valves 223a, 223b, 223c, and 223d may be provided to allow only the flow of the brake fluid in a direction from the wheel cylinder 40 toward the hydraulic provision unit 110 and limit the flow of the brake fluid in a direction from the hydraulic provision unit 110 toward the wheel cylinder 40. The check valves 223a, 223b, 223c, and 223d may quickly discharge the braking pressure of the wheel cylinder 40, and when the inlet valves 221a, 221b, 221c, and 221d do not operate normally, the hydraulic pressure of the wheel cylinder 40 may be introduced into the hydraulic provision unit 110.

In addition, the hydraulic circuits 201 and 202 may further include a plurality of outlet valves 222 (222a, 222b, 222c, and 222d) connected to the reservoir 30 to improve performance when braking is released. Each of the outlet valves 222 is connected to the wheel cylinder 40 to control the hydraulic pressure discharged from each of the vehicle wheels RR, RL, FR, and FL. In other words, the outlet valve 222 may detect the braking pressure of each of the vehicle wheels RR, RL, FR, and FL and may be selectively opened to control the pressure when braking pressure reduction is required.

In addition, the outlet valve 222 may be provided as the normally closed type solenoid valve operated so that the valve is opened when receiving the opening signal from the electronic control unit in the normally closed state.

In addition, the hydraulic control unit 200 may be connected to the backup flow paths 251 and 252. For example, the first hydraulic circuit 201 may be connected to the first backup flow path 251 to receive hydraulic pressure from the master cylinder 20, and the second hydraulic circuit 202 may be connected to the second backup flow path 252 to receive hydraulic pressure from the master cylinder 20.

At this time, the first backup flow path 251 may join the first hydraulic circuit 201 upstream of the first and second inlet valves 221a and 221b. Likewise, the second backup flow path 252 may join the second hydraulic circuit 202 upstream of the third and fourth inlet valves 221c and 221d. Therefore, when the first and second cut valves 261 and 262 are closed, the hydraulic pressure provided from the hydraulic supply device 100 may be supplied to the wheel cylinders 40 through the first and second hydraulic circuits 201 and 202, and when the first and second cut valves 261 and 262 are opened, the hydraulic pressure provided from the master cylinder 20 may be supplied to the wheel cylinders 40 through the first and second backup flow paths 251 and 252. At this time, since the plurality of inlet valves 221a, 221b, 221c, and 221d are in open states, there is no need to change operation states.

Figure 2:
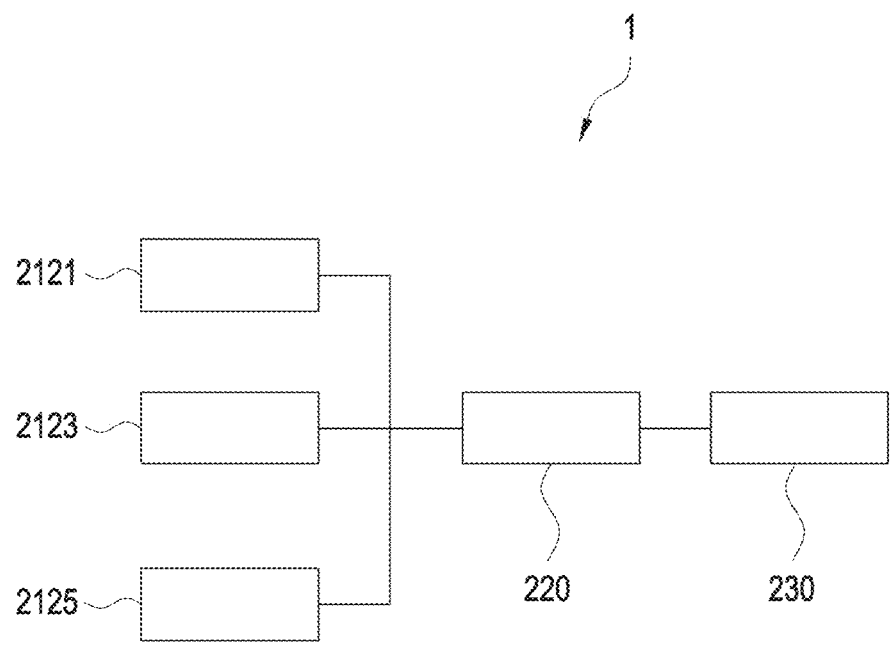
FIG. 2 is a block diagram showing the electromechanical brake system according to one embodiment of the present disclosure.

Referring to FIG. 2, the electromechanical brake system 1 according to one embodiment of the present disclosure needs to determine a section in which a required fluid amount of brake oil of a vehicle may be monitored. The required fluid amount of the brake oil represents the relationship between the position of the motor and the brake fluid pressure (pressure). Therefore, since the required fluid amount of the brake oil may vary depending on the state of the vehicle, the required fluid amount may temporarily vary, and thus it is necessary to exclude a case in which the required fluid amount varies temporarily. In other words, the required fluid amount of the brake oil may represent a volume of the brake oil required by the motor according to pressure.

To this end, a controller 220 may check the section in which the required fluid amount of the brake oil may be monitored through a temperature sensor 212, a pedal displacement sensor 214, and a pressure sensor 216. For example, the controller 220 monitors the required fluid amount of the brake oil through the temperature sensor 212 when an estimated brake temperature is lower than a set temperature and an outside air temperature is higher than the set temperature. In other words, the controller 220 monitors the required fluid amount of the brake oil at temperatures excluding a high estimated brake temperature and a low outer air temperature.

To this end, a controller 220 may check the section in which the required fluid amount of the brake oil may be monitored through a temperature sensor 2121, a pedal displacement sensor 2123, and a pressure sensor 2125. For example, the controller 220 monitors the required fluid amount of the brake oil through the temperature sensor 2121 when an estimated brake temperature is lower than a set temperature and an outside air temperature is higher than the set temperature. In other words, the controller 220 monitors the required fluid amount of the brake oil at temperatures excluding a high estimated brake temperature and a low outer air temperature.

Therefore, the controller 220 monitors the required fluid amount when the required fluid amount that is increased with respect to the required fluid amount reference, which is a basic required fluid amount according to a map, satisfies a predetermined condition. Here, the required fluid amount reference according to the map is stored in a storage 230 of the electromechanical brake system 1.

In addition, the controller 220 calculates a ratio of the required fluid amount having an increased required fluid amount and the required fluid amount reference according to the map. To this end, the controller 220 uses a position of the motor and an area of the piston in order to first calculate the required fluid amount. In other words, the required fluid amount may be calculated by multiplying the position of the motor by the area of the piston.

The controller 220 calculates the ratio of the required fluid amount and the required fluid amount reference using the thus calculated required fluid amount. In other words, the controller 220 calculates the ratio by dividing the required fluid amount by the required fluid amount reference.

As described above, the controller 220 changes the required fluid amount reference stored in the storage 230 according to the calculated ratio of the required fluid amount and determines whether to apply the changed required fluid amount reference. In order to determine whether to apply the changed required fluid amount reference, the controller 220 checks whether the ratio has been calculated at least three times in a pressure zone of one section and checks whether the ratio has been calculated in pressure zones of at least three sections. In addition, the controller 220 checks whether a traveling distance of the vehicle is a predetermined distance or more and checks whether the traveling distance is the predetermined distance or more after the required fluid amount reference has been corrected.

Only when the above condition is satisfied, the controller 220 applies the calculated required fluid amount to the required fluid amount reference previously stored in the storage 230 to change the required fluid amount reference previously stored.

Figure 4:
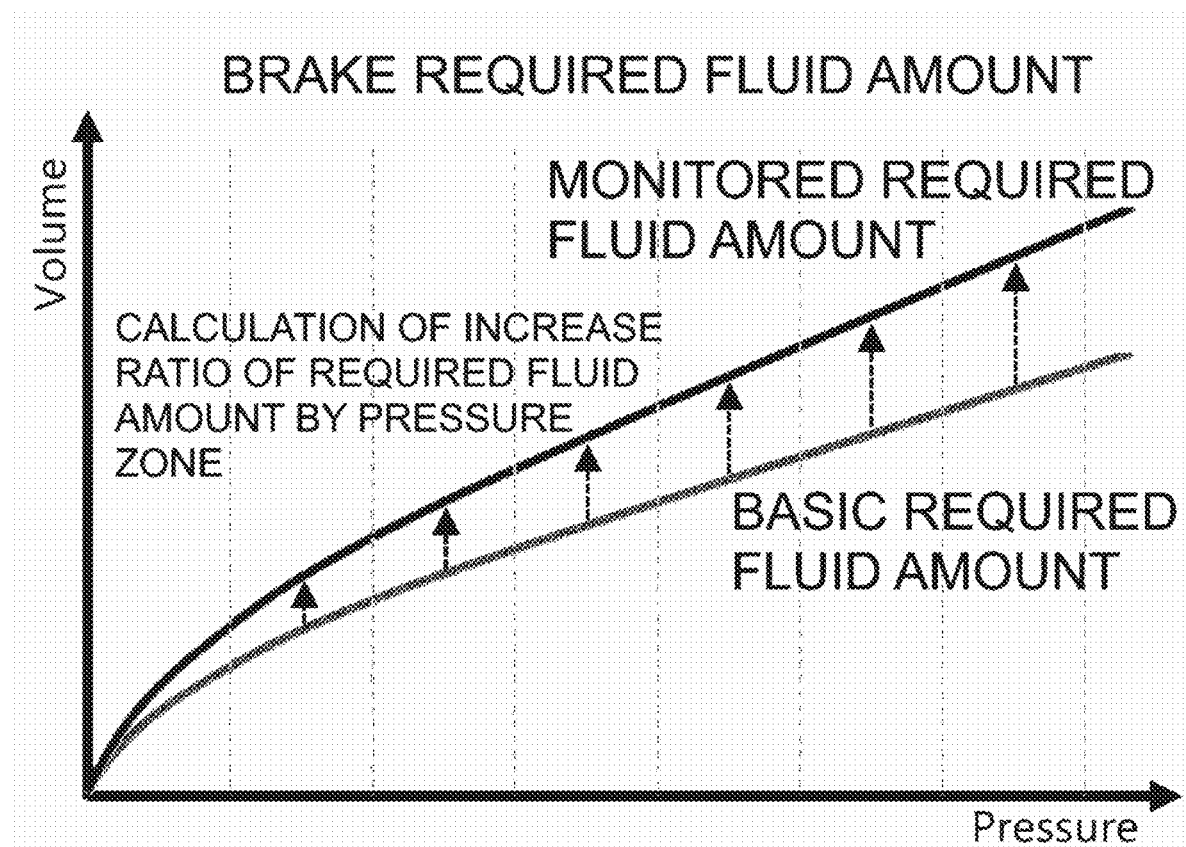
FIG. 4 is a graph for describing calculation of an increase rate of a required fluid amount in the electromechanical brake system according to one embodiment of the present disclosure.
Figure 5:
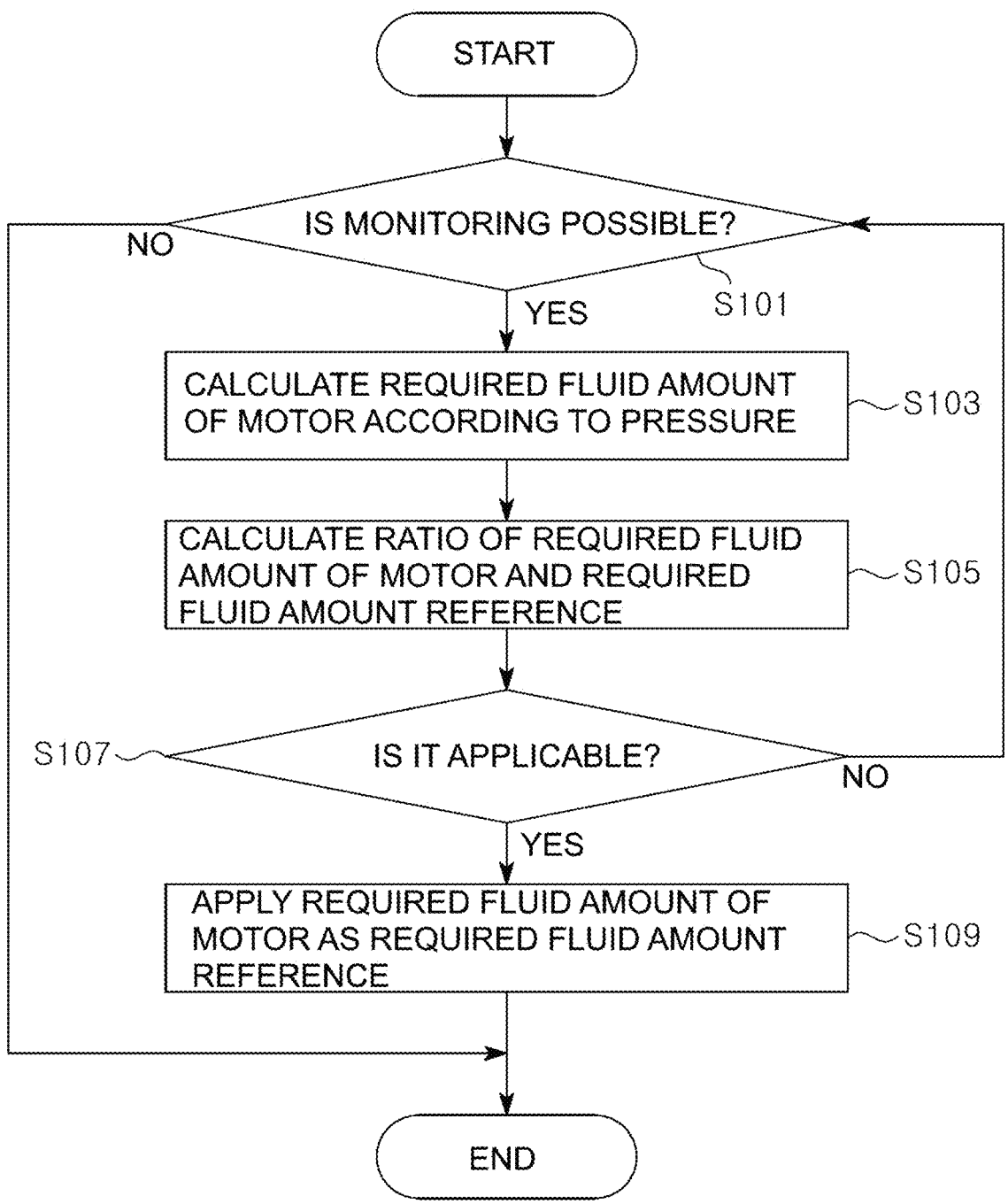
FIG. 5 is a flowchart for describing a method of controlling an electromechanical brake system according to one embodiment of the present disclosure.

Referring to FIG. 5, a method of controlling the electromechanical brake system 1 according to one embodiment of the present disclosure will be described. The method of controlling the electromechanical brake system 1 according to one embodiment of the present disclosure will be described with reference to FIGS. 1 to 4.

Whether monitoring is possible is determined (S101).

In the electromechanical brake system 1, brake oil is required to generate a braking force by the motor. A required fluid amount is actually changed depending on a state of a vehicle as compared to a required fluid amount reference according to a map, and the controller 220 needs to monitor how much the required fluid amount is changed as compared to the required fluid amount reference.

In this operation, as described above, whether to monitor the required fluid amount is determined. Here, since there is a case in which the required fluid amount is temporarily changed in the electromechanical brake system 1, the controller 220 monitors the continuously changing required fluid amount except for a case in which the required fluid amount is temporarily changed.

The controller 220 determines that a case in which an estimated brake temperature is higher than a set temperature and a case in which an outside air temperature is lower than the set temperature are cases in which the required fluid amount is temporarily changed. In addition, the controller 220 determines that a case in which the required fluid amount is actively increased by a driver, a case in which the vehicle suddenly decelerates, and a case in which the brake oil pressure is low are cases in which the required fluid amount is temporarily changed.

Therefore, in this operation, as described above, the controller 220 determines that cases except for the case in which the required fluid amount is temporarily changed are in a situation in which the required fluid amount may be monitored.

When it is determined that monitoring of the required fluid amount is possible, the required fluid amount according to pressure is calculated (S103).

Figure 3:
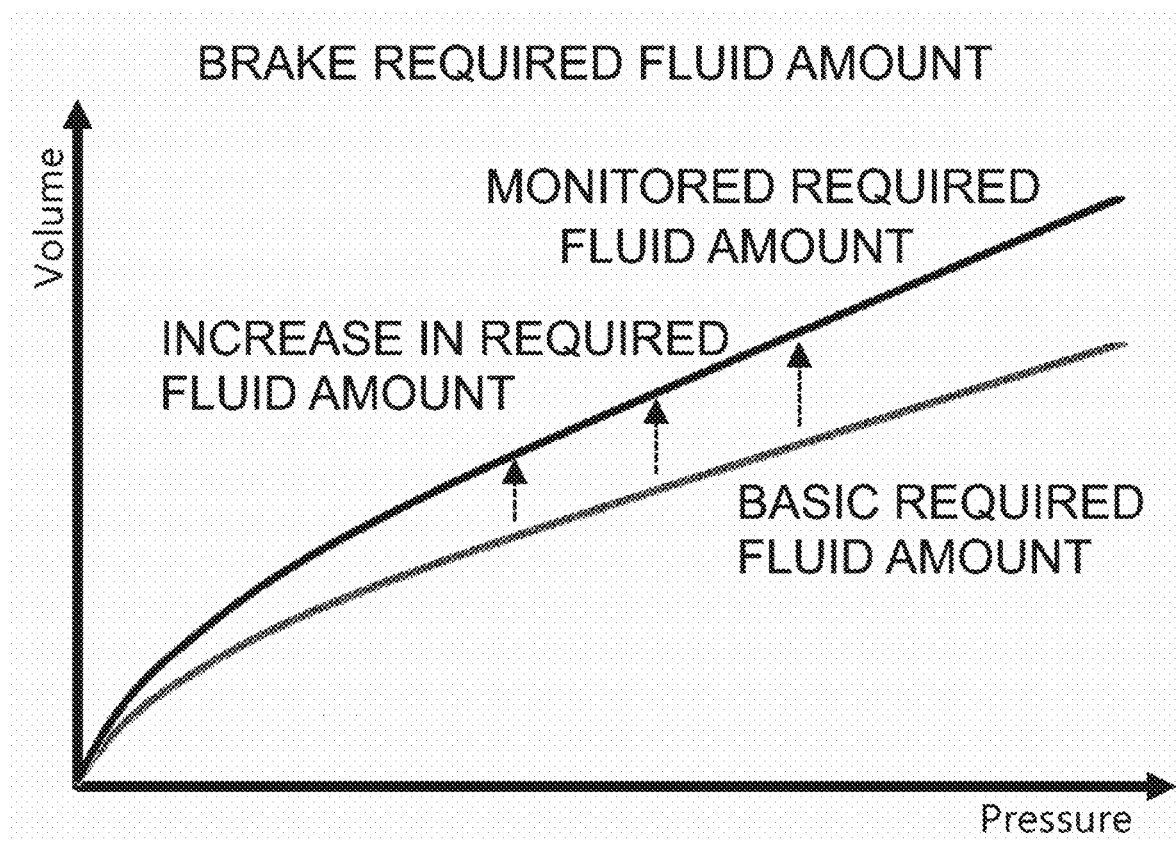
FIG. 3 is a graph for describing determination of a section in which monitoring is possible in the electromechanical brake system according to one embodiment of the present disclosure.

The required fluid amount according to pressure is calculated using a position of the motor and an area of the piston. In this operation, the controller 220 calculates the required fluid amount in real time according to pressure as shown in FIG. 3 in order to calculate the required fluid amount.

As described above, when the required fluid amount is calculated, the ratio of the calculated required fluid amount and the required fluid amount reference is calculated (S105).

The controller 220 calculates the ratio of the required fluid amount and the required fluid amount reference. The ratio of the required fluid amount and the required fluid amount reference may be an increase in the required fluid amount with respect to the required fluid amount reference at the same pressure.

In this operation, as shown in FIG. 4, the ratio of the required fluid amount and the required fluid amount reference is divided into a plurality of sections according to pressure, calculated in at least three sections among a plurality of sections, and also calculated three times or more in one section.

The controller 220 calculates the ratio of the required fluid amount and the required fluid amount reference multiple times in the plurality of sections as described above.

As described above, when the ratio of the required fluid amount and the required fluid amount reference is calculated, whether the calculated ratio is applicable is determined (S107).

With regard to whether the calculated ratio is applicable, the controller 220 determines that the calculated ratio is applicable in a case in which the ratio has been calculated multiple times in the plurality of sections in the operation S105. In addition, the controller 220 determines that the calculated ratio is applicable when a traveling distance is a predetermined distance or more after the vehicle is mass-produced and determines that the calculated ratio is applicable when the traveling distance is the predetermined distance or more after the required fluid amount reference has been corrected.

Here, "applicable" means that the controller 220 changes the required fluid amount reference stored in the storage 230 to the required fluid amount calculated in the operation S103 and stores the calculated required fluid amount.

Here, when the calculated required fluid amount may not be applied for replacing the current required fluid amount reference, the method may return to the operation S101.

When it is determined that the required fluid amount is applicable, the fluid required amount of the motor is applied as the required fluid amount reference (S109).

When it is determined in the operation S107 that the required fluid amount calculated in the operation S105 is applicable, the controller 220 stores the required fluid amount calculated in the operation S105 in the storage 230 instead of the required fluid amount reference stored in the storage 230. In the operation, the required fluid amount newly stored is used as the required fluid amount reference later.

As is apparent from the above description, it is possible to monitor the variation of the required fluid amount of brake oil according to a state of a vehicle in real time and apply a monitored result to a required fluid amount reference corresponding to a reference amount, thereby preventing the degradation of brake performance.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An electromechanical brake system comprising:
   a temperature sensor configured to measure one or more of a brake oil temperature and an outside air temperature;
   a pressure sensor configured to measure a pressure for a required fluid amount depending on an actual pressure for brake oil required to generate a braking force by a motor; and
   a controller configured to determine whether to monitor the required fluid amount based on the pressure for the required fluid amount, and one or more of a brake temperature estimated by the temperature sensor and the outside air temperature, and in response to monitoring of the required fluid amount, calculate a ratio of the required fluid amount and a required fluid amount reference according to a map and the required fluid amount,
   wherein the controller is configured to monitor the required fluid amount when the brake temperature is lower than a set first temperature and the outside air temperature is higher than a set second temperature.

2. The electromechanical brake system of claim 1, wherein the controller applies the required fluid amount as the required fluid amount reference according to the ratio of the required fluid amount and the required fluid amount reference according to the map.

3. The electromechanical brake system of claim 1, wherein the controller monitors the required fluid amount in cases in which the required fluid amount is continuously changed.

4. The electromechanical brake system of claim 3, wherein the cases in which the required fluid amount is continuously changed are cases excluding a case in which the brake temperature is higher than the set first temperature and a case in which the outside air temperature is lower than the set second temperature.

5. The electromechanical brake system of claim 3, wherein the cases in which the required fluid amount is continuously changed are cases excluding one or more among a case in which the required fluid amount is actively increased by a driver, a case in which a vehicle suddenly decelerates, and a case in which a brake oil pressure is low.

6. The electromechanical brake system of claim 1, wherein the controller determines whether the required fluid amount is applicable as the required fluid amount reference, and applies the required fluid amount as the required fluid amount reference.

7. The electromechanical brake system of claim 6, wherein the controller determines that the ratio of the required fluid amount and the required fluid amount reference is applicable when calculated in a plurality of sections divided according to the pressure.

8. The electromechanical brake system of claim 6, wherein the controller determines that the ratio of the required fluid amount and the required fluid amount reference is applicable when calculated multiple times in one or more among a plurality of sections divided according to the pressure.

9. The electromechanical brake system of claim 6, wherein the controller determines that the ratio of the required fluid amount and the required fluid amount reference is applicable when a traveling distance of a vehicle to which the braking force is provided by the motor is a predetermined distance or more.

10. The electromechanical brake system of claim 6, wherein the controller determines that the ratio is applicable when a traveling distance of a vehicle to which the braking force is provided by the motor is a predetermined distance or more after the required fluid amount has been applied as the required fluid amount reference.

* * * * *